US011212524B2

United States Patent
Edpalm

(10) Patent No.: US 11,212,524 B2
(45) Date of Patent: Dec. 28, 2021

(54) VIDEO CAMERA, CONTROLLER, AND METHOD FOR CONTROLLING OUTPUT BITRATE OF A VIDEO ENCODER

(71) Applicant: AXIS AB, Lund (SE)

(72) Inventor: Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 129 days.

(21) Appl. No.: 15/960,091

(22) Filed: Apr. 23, 2018

(65) Prior Publication Data

US 2018/0309986 A1    Oct. 25, 2018

(30) Foreign Application Priority Data

Apr. 24, 2017    (EP) .................................... 17167724

(51) Int. Cl.
*H04N 19/164*    (2014.01)
*H04N 19/115*    (2014.01)
(Continued)

(52) U.S. Cl.
CPC ....... *H04N 19/115* (2014.11); *H04N 5/23229* (2013.01); *H04N 7/18* (2013.01); *H04N 7/183* (2013.01); *H04N 19/139* (2014.11); *H04N 19/14* (2014.11); *H04N 19/164* (2014.11); *H04N 19/179* (2014.11); *H04N 19/184* (2014.11); *H04N 19/52* (2014.11);
(Continued)

(58) Field of Classification Search
CPC ........ H04N 7/18; H04N 19/14; H04N 19/179; H04N 7/183; H04N 19/115; H04N 21/2187; H04N 21/234354; H04N 21/2662; H04N 5/23229
See application file for complete search history.

(56) References Cited

U.S. PATENT DOCUMENTS 5,686,963 A    11/1997    Uz et al.
5,847,761 A    12/1998    Uz et al.
(Continued)

FOREIGN PATENT DOCUMENTS

CA    2137266       12/1994
EP    0802682 A1    10/1997
(Continued)

OTHER PUBLICATIONS

Extended European Search Report, European Application No. 17167732. 1, dated Jul. 12, 2017.
(Continued)

*Primary Examiner* — Dave Czekaj
*Assistant Examiner* — Berteau Joisil
(74) *Attorney, Agent, or Firm* — Volpe Koenig

(57) ABSTRACT

A controller and a method for controlling output bitrate of a video encoder when encoding a video stream. The method for controlling output bitrate of a video encoder when encoding a video stream comprises: receiving weather forecast data for a location where the video stream is captured; predicting, based on the weather forecast data, a future increase in output bitrate of the video encoder due to weather affecting contents of the video stream; and reducing the output bitrate of the video encoder by increasing a compression level of the video stream so as to compensate for the future increase in output bitrate of the video encoder.

20 Claims, 5 Drawing Sheets

(51) Int. Cl.
    *H04N 5/232*     (2006.01)
    *H04N 19/139*     (2014.01)
    *H04N 19/52*     (2014.01)
    *H04N 19/184*     (2014.01)
    *H04N 21/2343*     (2011.01)
    *H04N 21/2662*     (2011.01)
    *H04N 19/179*     (2014.01)
    *H04N 19/14*     (2014.01)
    *H04N 21/845*     (2011.01)
    *H04N 7/18*     (2006.01)
    *H04N 21/2187*     (2011.01)

(52) U.S. Cl.
    CPC . *H04N 21/2187* (2013.01); *H04N 21/234354* (2013.01); *H04N 21/2662* (2013.01); *H04N 21/8456* (2013.01)

(56) References Cited

U.S. PATENT DOCUMENTS

| | | |
|---|---|---|
| 6,982,762 B1 | 1/2006 | Hui |
| 7,496,142 B2 | 2/2009 | Hui et al. |
| 9,083,971 B2 | 7/2015 | Van Veldhuisen et al. |
| 9,215,467 B2 | 12/2015 | Cheok et al. |
| 9,411,072 B1 | 8/2016 | Dixon |
| 2002/0012530 A1 | 1/2002 | Bruls |
| 2002/0122482 A1 | 9/2002 | Kim et al. |
| 2005/0024236 A1* | 2/2005 | Gosdin .............. H04H 60/71 340/905 |
| 2005/0169370 A1 | 8/2005 | Lee |
| 2007/0040917 A1 | 2/2007 | Kobayashi |
| 2009/0086024 A1 | 4/2009 | Brookins |
| 2010/0124274 A1* | 5/2010 | Cheok .............. H04N 19/152 375/240.03 |
| 2011/0021186 A1* | 1/2011 | Fischer .............. H01Q 1/246 455/424 |
| 2013/0202031 A1 | 8/2013 | Tripathi et al. |
| 2015/0350276 A1* | 12/2015 | Karlsson .............. H04L 65/60 709/231 |
| 2015/0358537 A1* | 12/2015 | Mirza .............. H04N 21/2543 348/231.99 |

FOREIGN PATENT DOCUMENTS

| | | |
|---|---|---|
| JP | 10-098683 A2 | 4/1998 |
| JP | 2006197140 A2 | 7/2006 |
| JP | 2007251719 A2 | 9/2007 |
| JP | 2014180024 A2 | 9/2014 |
| WO | 16181150 A1 | 11/2016 |

OTHER PUBLICATIONS

Extended European Search Report, European Application No. 17167724.8, dated Nov. 2, 2017.

* cited by examiner

VIDEO CAMERA, CONTROLLER, AND METHOD FOR CONTROLLING OUTPUT BITRATE OF A VIDEO ENCODER

FIELD OF INVENTION

The present teachings relate to the field of video encoding. In particular, it relates to control of an output bitrate of a video encoder.

BACKGROUND

Video cameras are commonly used for surveillance. In surveillance applications, a video camera is arranged to monitor a scene by capturing a video stream depicting the scene. The video stream is then encoded prior to being stored. The encoded video stream may be stored in the video camera itself, but typically it is transmitted over a network to, for instance, a server where it is stored. If it is found out that some event of interest has happened in the scene, such as a burglary taking place, it is possible to access the encoded video stream from the storage and view it to find evidence of the event of interest.

The video encoder of the video camera described above thus produces a certain amount of stored video data during a time period. Since the storage space may be a limiting factor, it may be of interest to control the amount of video data that is produced by the video encoder, i.e., the output bitrate of the video encoder, such that the available storage space lasts for a time period of pre-set duration, such as a week or a month.

At the same time, it is of course of interest that the output bitrate of the video encoder is allowed to vary so as to capture bitrate peaks which are caused by interesting motion in the video stream (such as the burglar of the example above), while restricting bitrate peaks caused by, for instance, noise or other factors which have a negative impact on the video quality. While, for instance, night time noise is easy to plan for, another factor that may have a negative impact on the video quality is weather events such as rain, snow, fog or heavy winds. These weather events will typically affect the contents of the video stream and introduce undesirable noise or motion, thereby giving rise to bitrate peaks that provide no additional surveillance information. For example, a weather event may cause the video encoder to spend most of its weekly or monthly allocated bits on a weather caused peak in bitrate already the first day, leaving few bits for the remaining time period.

Although there is prior art, including U.S. 2015/0358537 A1, that generally links weather data to compression, there is no prior teaching of how to restrict or compensate for bitrate peaks caused by future weather events. There is thus room for improvements.

SUMMARY

In view of the above, it is thus an object of the present disclosure to restrict or compensate for bitrate peaks caused by future weather events.

According to a first aspect, the above object is achieved by a method for controlling output bitrate of a video encoder when encoding a video stream, comprising: receiving weather forecast data for a location where the video stream is captured; predicting, based on the weather forecast data, a future increase in output bitrate of the video encoder due to weather affecting contents of the video stream; and reducing the output bitrate of the video encoder by increasing a compression level of the video stream so as to compensate for the future increase in output bitrate of the video encoder.

According to this method, weather forecast data is used to predict a future increase in output bitrate of a video encoder. When a future increase in output bitrate of the video encoder has been predicted, a compression level applied by the video encoder when compressing the video stream is increased. In this way, the output bitrate of the video encoder goes down, and hence the future increase in output bitrate can be compensated for. The compression level may be increased in relation to a current compression level. The current compression level may correspond to a nominal compression level which is set at the start of the time interval. However, the current compression level may also correspond to the compression level as adjusted after the start of the time interval, such as during the time period from the start of the time interval until a current time point of the time interval.

The term compression level as used herein generally refers to how much the video stream is compressed. This is typically a parameter of the video encoder that may be varied. For example, the compression level may be in the form of a quantization parameter.

By contents of the video stream as used herein is generally meant the image contents of the frames of the video stream. Weather, such as rain, snow, fog or wind, will typically affect the image contents of the video stream by introduction of noise or motion in the frames of the video stream.

The weather forecast data may be in the form of various weather-related parameters. The weather-related parameters may be used to predict the future increase in output bitrate caused by weather, e.g., by comparing the parameters to various predetermined thresholds. More specifically, the weather forecast data may comprise a parameter being indicative of a weather condition, and wherein, in the step of predicting, a future increase in output bitrate is predicted if the parameter falls outside a predetermined parameter interval.

In some applications, the control of the output bitrate of the video encoder aims at controlling the amount of data that is output of the encoder such that the total number of bits that are output during a certain time interval does not exceed a certain level. In other words, the video encoder may have a bit budget that it may spend during a certain time interval. As an unexpected bit cost comes up, here represented by the weather causing a future increase in bitrate, the video encoder has to take action to compensate for the unexpected bit cost. Otherwise the bit budget will likely be exceeded in the end. The method may therefore further comprise setting a bit budget corresponding to a maximum number of bits that are allowed to be output from the video encoder during a time interval, wherein, in the step of reducing the output bitrate, the compression level of the video stream is increased during at least a portion of the time interval such that the bit budget is not exceeded.

The compression level may thus be increased in order to compensate for unexpected bit costs in the form of bitrate peaks caused by weather. However, the compression level may not only be increased in order to compensate for unexpected bit costs, but it may repeatedly during the time interval be adjusted to make sure that the bit budget is not exceeded as the time interval comes to an end. For example, the method may further comprise adjusting the compression level of the video stream periodically during the time interval such that the bit budget is not exceeded. This may include increasing the compression level if the number of bits that has been spent so far during the time interval is higher than expected, or decreasing the compression level if the number of bits that has been spent so far is lower than expected.

The expected number of spent bits may correspond to the average number of bits that were spent at the same point in time for previous time intervals of the same duration. In this respect, a parallel may be drawn to a monthly household budget. In a monthly household budget, there are expected costs and unexpected costs. The expected costs may correspond to a rent that has to be paid at the end of the month, and the unexpected costs may correspond to a bill for repairing a water leak that was not anticipated. The expected costs are easy to plan for in view of costs that usually come up each month, whereas the unexpected costs are much more difficult to handle. Still, the monthly budget has to cover both expected and unexpected costs, and if an unexpected cost comes up, the expenses of the household have to be reduced in one way or the other so that there is enough money to pay the bills at the end of the month.

Returning to the bit budget of the video encoder, there are unexpected costs corresponding to the bit costs that are caused by weather as explained above, and there may also be expected bit costs. Similar to the household budget, the expected bit costs and the time point of the time interval when they occur may be deduced from historical data. For example, bitrate data from previous time intervals of the same duration may be collected from which an average temporal variation of output bitrate of the video encoder during the time interval may be calculated. The so calculated average temporal variation curve may for example be used to, at any time point within the time interval, estimate the bit costs which on average occur up until that time point of the time interval. This may be used to control the output bitrate so as to make sure that the bit budget is not exceeded.

In more detail, the method may further comprise receiving previously collected bitrate data indicating an average temporal variation of output bitrate of the video encoder during the time interval, and calculating, from the previously collected bitrate data, a number of bits which on average is output from the video encoder at a current time point of the time interval, wherein, in the step of adjusting the compression level periodically, the compression level is increased if a number of bits that has been output from the video encoder at the current time point exceeds the calculated number of bits which on average is output from the video encoder at the current time point, and the compression level is decreased if the number of bits that has been output from the video encoder at the current time point is below the calculated number of bits which on average is output from the video encoder at the current time point.

The previously collected bitrate data may also be used to set a nominal compression level of the video stream. The nominal compression level may serve as a base level with respect to which the compression level is adjusted, i.e., increased or decreased. In more detail, the method may further comprise: receiving previously collected bitrate data indicating an average temporal variation of output bitrate of the video encoder during the time interval, and setting a nominal compression level of the video stream based on the previously collected bitrate data during the time interval such that the bit budget for the time interval is not exceeded, wherein, in the step of reducing the output bitrate of the video encoder, the compression level is increased from said nominal compression level.

In the above, a nominal compression level thus refers to a compression level which is set on basis of the average temporal variation curve, i.e., the expected future costs, such that the expected future bit costs will be covered by the bit budget. The nominal compression level is typically set at the outset of the time interval, and may hence serve as a start value for the compression level.

The method may further comprise keeping track of a number of bits that, according to the bit budget, remains to be output from the video encoder during the time interval, and a remaining time of the time interval, wherein, in the step of reducing the output bitrate of the video encoder, the compression level is increased by an amount which is determined based on at least the number of bits that remains to be output from the video encoder during the time interval, and the remaining time of the time interval. The method may thus, at all times, keep track of how many bits that are left to spend during the remainder of the time interval, and the remaining time. Based on that information, the amount by which the compression level is increased to compensate for the weather caused increase in bitrate may be set.

The amount may further be determined based on the previously collected bitrate data indicating an average temporal variation of output bitrate of the video encoder during the time interval. In this way, the future expected bit costs, which may be deduced from the average temporal variation curve, may also be taken into account when deciding by how much the compression level should be increased to compensate for the weather caused increase in bitrate.

The portion of the time interval during which the compression level is increased may be selected in different ways. For example, the at least a portion of the time interval may be selected based on the weather forecast data, such that the compression level of the video stream is increased during the predicted future increase of output bitrate of the video encoder. In other words, the compression level may be increased when the weather is predicted to occur.

The at least a portion of the time interval may also be selected based on previously collected bitrate data indicating an average temporal variation of output bitrate of the video encoder during the time interval. For example, assuming that it is important to catch the bitrate peaks in the average temporal variation of output bitrate, the compression level may be increased when there are no bitrate peaks in the average temporal variation of output bitrate. Such portions may be identified as the time portions when the average temporal variation of output bitrate falls below a threshold. More specifically, the at least a portion of the time interval may be selected based on the previously collected bitrate data such that the compression level of the video stream is increased during a portion of the time interval when the previously collected bitrate data exceeds a predetermined threshold or during a portion of the time interval when the previously collected bitrate data is below a predetermined threshold.

Alternatively, the compression level of the video stream may be increased for the remainder of the time interval. In this way, the compensation of the weather caused increase in bitrate is distributed over the remainder of the time interval.

According to yet an example, the at least a portion of the time interval may be selected based on contents in the video stream. For example, the compression level may be increased during time portions when the level of motion in the video stream is below a threshold. In that way, one can make sure that interesting portions of the video stream are still encoded with a high quality.

According to a second aspect, the above object is achieved by a controller for controlling output bitrate of a video encoder when encoding a video stream, comprising: a receiver configured to receive weather forecast data for a location where the video stream is captured; a predictor configured to predict, based on the weather forecast data, a future increase in output bitrate of the video encoder due to weather affecting contents of the video stream; and an output bitrate adjuster configured to reduce the output bitrate of the video encoder by increasing a compression level of the video stream so as to compensate for the future increase in output bitrate of the video encoder.

According to a third aspect, the above object is achieved by a video camera comprising a video encoder and a controller according to the second aspect for controlling output bitrate of the video encoder.

According to a fourth aspect, there is provided a computer program product comprising a computer-readable medium with computer-code instructions adapted to carry out the method of the first aspect when executed by a device having processing capability.

The second, third, and fourth aspects may generally have the same features and advantages as the first aspect. It is further noted that the present teachings relate to all possible combinations of features unless explicitly stated otherwise.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. This present teachings may, however, be embodied in many different forms and should not be construed as limited to the embodiments set forth herein; rather, these embodiments are provided for thoroughness and completeness, and to fully convey the scope of the present teachings to the skilled person. The systems and devices disclosed herein will be described during operation.

Figure 1:
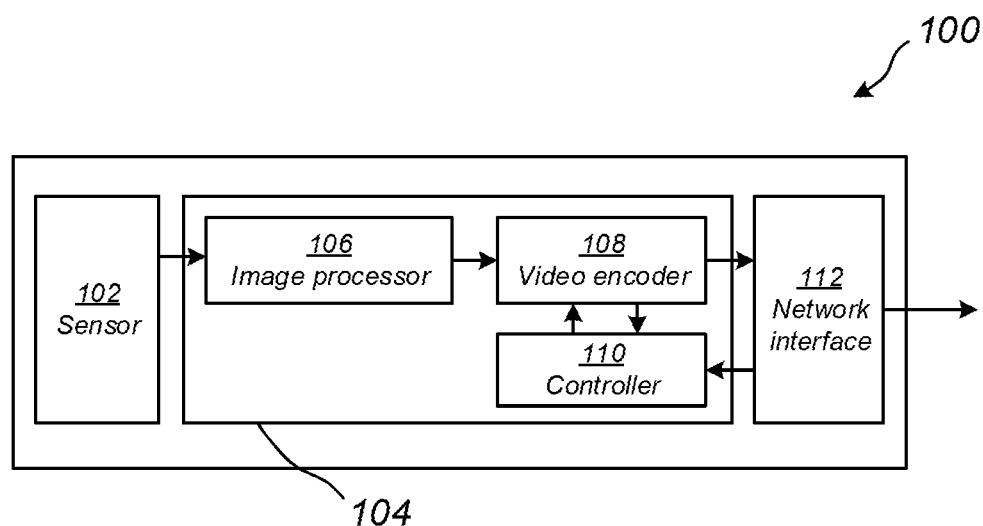
FIG. 1 is a schematic illustration of a video camera according to embodiments.

FIG. 1 illustrates a video camera 100. The video camera comprises a sensor 102, an image pipeline 104, and a network interface 112.

The video camera 100 is arranged, via sensor 102, to capture a video stream. The video stream comprises a sequence of frames of image data. The image data, as captured by the sensor 102, is in the form of image raw data. That image data in its raw format is forwarded, frame by frame, to the image pipeline 104 where it is processed and encoded. For this purpose, the image pipeline 104 comprises an image processor 106 and a video encoder 108. The image processor 106 may in various processing steps process the image raw data of the frames in a manner already known in the art. The processed image data is then encoded by video encoder 108.

The video encoder 108 outputs the encoded image data of the video stream in the form of a bitstream. The bitstream is typically sent out over a network, via network interface 112, to a storage unit, which for instance may be located on a server. Alternatively, the video camera 100 may itself comprise a storage, typically in the form of non-volatile memory, for storing the encoded video stream.

The video encoder 108 thus outputs a bitstream. The rate at which the video encoder 108 outputs bits, i.e., the output bitrate of the video encoder 108 may be controlled by a controller 110. The controller may be implemented as a part of the video encoder 108 or as a separate unit. For this purpose, the controller 110 may send a control signal to the video encoder 108. The control signal may particularly instruct the video encoder 108 to adjust its compression level. In this respect, the compression level may, e.g., refer to the quantization parameter of the H.264 standard. Alternatively, or additionally, the compression level may be adjusted by adjusting the frame rate of the video encoder 108. As the compression level is increased, the output bitrate of the video encoder 108 will decrease, and vice versa.

Figure 2:
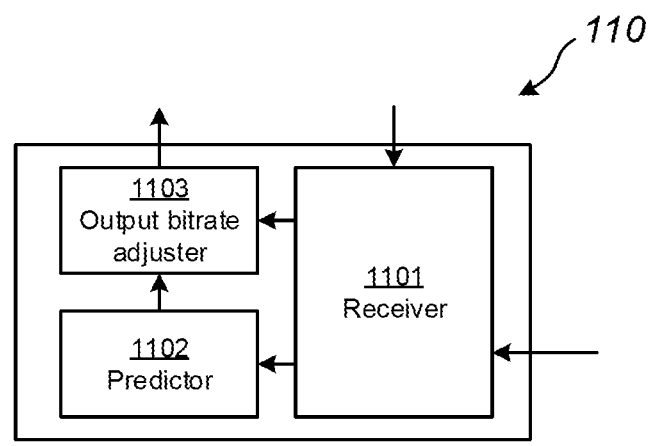
FIG. 2 is a schematic illustration of a controller for controlling an output bitrate of the video encoder of the video camera of FIG. 1.

The controller 110 and its components are shown in more detail in FIG. 2. The controller 110 comprises a receiver 1101, a predictor 1102, and an output bitrate adjuster 1103.

The controller 110 thus comprises various components 1101, 1102, 1103 which are configured to implement the functionality of the controller 110. In particular, each illustrated component corresponds to a functionality of the controller 110. Generally, the controller 110 may comprise circuitry which is configured to implement the components 1101, 1102, 1103 and, more specifically, their functionality.

In a hardware implementation, each of the components 1101, 1102, 1103 may correspond to circuitry which is dedicated and specifically designed to provide the functionality of the component. The circuitry may be in the form of one or more integrated circuits, such as one or more application specific integrated circuits. By way of example, the output bitrate adjuster 1103 may thus comprise circuitry which, when in use, reduces the output bitrate of the video encoder by increasing the compression level.

In a software implementation, the circuitry may instead be in the form of a processor, such as a microprocessor, which in association with computer code instructions stored on a (non-transitory) computer-readable medium, such as a non-volatile memory, causes the controller to carry out any method disclosed herein. In that case, the components 1101, 1102, 1103 may thus each correspond to a portion of computer code instructions stored on the computer-readable medium, that, when executed by the processor, causes the controller 110 to carry out the functionality of the component.

It is to be understood that it is also possible to have a combination of a hardware and a software implementation, meaning that the functionality of some of the components 1101, 1102, 1103 are implemented in hardware and others in software.

The operation of the controller will be described in the following with reference to FIGS. 1 and 2 and the flow chart of FIG. 3.

In step S302, the receiver 1101 receives weather forecast data. The weather forecast is with respect to a location where the video stream is captured, i.e., with respect to a location of the video camera 100. The weather forecast data may be received from the network via network interface 112. For example, the weather forecast data may be received from an internet-based weather forecast service.

The weather forecast data is generally indicative of future weather at the location of the video camera 100. For example, the weather forecast data may be in the form of one or more parameters. This may include rain fall levels, snow levels, moisture levels, temperature, and/or wind speed. These parameters may alone or together be indicative of a weather condition at the location of the video camera 100. For example, the rain fall level is indicative of rain fall, the snow level is indicative of snow fall, the moisture level together with a temperature is indicative of fog, and the wind speed is indicative of wind. The weather forecast data may also indicate when in time the weather condition, as specified by the one or more parameters, will occur.

In step S304, the predictor 1102 predicts, based on the weather forecast data, a future increase in the output bitrate of the video encoder 110. In an outdoor situation, i.e., where the video camera 100 is located outdoors, various weather conditions will affect the contents of the video stream, such as introducing undesirable noise or motion in the video stream. For example, rain or snow fall will give rise to an increased noise level in the images, and heavy winds may cause branches and leaves of trees in the scene to move. Such noise and motion is undesirable from a surveillance point of view since it adds no additional surveillance information. Still, the noise or motion caused by the weather condition will be in the video stream, and it will cause an increase in output bitrate since noise and motion are costly to encode.

As described above, the weather forecast data is indicative of the future weather condition at the location of the camera 100, and may therefore be used to predict that, and even when, there will be a future increase in the output bitrate of the video encoder 108. For example, the predictor 1102 may compare the one or more parameters of the weather forecast data to some predefined parameter intervals to see whether they fall inside or outside the predefined parameter intervals. A parameter falling outside a predefined parameter interval, may serve as an indication that there is a weather condition that will affect the image data such that there in the end will be an increase in output bitrate. Accordingly, the predictor 1102 may predict a future increase in output bitrate if one, or several, parameters fall outside the predefined parameter intervals.

When the predictor 1102 has predicted a future increase in output bitrate due to weather affecting the image contents of the video stream as explained above, the method proceeds to step S306. In step S306, the output bitrate adjuster 1103 takes action to compensate for the predicted future increase in output bitrate. In more detail, the output bitrate adjuster 1103 takes a decision to increase the compression level of the video encoder 108. The output bitrate adjuster 1103 may, e.g., send a control signal to the video encoder 108 that it should increase the compression level. For example, the quantization parameter of the video encoder 108 could be increased. Alternatively, or additionally, the frame rate of the encoded video stream could be decreased. As a result, when the compression level of the video encoder 108 is increased, the output bitrate will be reduced. In this way, the predicted increase in bitrate due to the weather condition may be compensated for. Preferably, the compression level is increased such that the increase in bitrate due to the weather condition is completely compensated for.

The output bitrate adjuster 1103 may control the video encoder 108 to increase the compression level immediately, i.e., as soon as a bad weather condition has been predicted. However, the output bitrate adjuster 1103 may also control the video encoder 108 to increase the compression level when the weather condition is expected to occur, i.e., during the predicted future increase of output bitrate. The increase in compression level may be until further notice, or it may be momentary, i.e., time limited. For example, the increase in compression level may be limited to apply only during the time period when the increase in bitrate due to the weather condition is predicted to occur. According to still another option, the time period when the compression level should be increased may be selected based on contents in the video stream, such as the level of motion in the video stream. In more detail, the controller 110 may have access to the video stream to be encoded, e.g., via the video encoder 108. The output bitrate adjuster 1103 may then decide to increase the compression level during periods when, for instance, the level of motion in the video stream is below a threshold.

The amount of the increase of the compression level generally depends on the severity of the expected weather condition. The "stronger" the weather, the more the compression level has to be raised. However, in practice this will also depend on the location of the camera, and empirical tests are needed to find an appropriate increase of the compression level for a camera at a specific location. By way of example, the camera may be mounted in a protected spot, where it is hardly impacted by weather, or it may be in an exposed location, such as on a bridge over open water, where even fairly mild weather has large effect on the image contents and the resulting bitrate. Thus, the weather susceptibility of the camera has to be tested in order to find out by how much the compression level should be raised in order to compensate for a future increase in bitrate caused by weather.

As described with reference to FIG. 1, the encoded video stream may be stored. In some situations, there is only a certain amount of storage space available, and it is desirable that the available storage space should last for a predefined amount of time, such as a day, a week or a month. In other words, there may be a certain bit budget which defines a maximum number of bits that are allowed to be output from the video encoder 108 during a time interval. In such situations, the controller 110 should not only control the output bitrate of the video encoder 108 to compensate for bitrate peaks caused by weather, but the controller 110 should additionally control the output bitrate, by adjusting the compression level, such that the bit budget is not exceeded. The method described with reference to FIG. 3 may also be implemented in the context of such a situation. This will be described in more detail in the following with reference to FIGS. 1 and 2, FIGS. 5a-d, and the flow chart of FIG. 4.

In step S402, a bit budget is set for a time interval. The bit budget corresponds to a maximum number of bits that are allowed to be output from the video encoder 108 during a time interval T. The bit budget is typically an input parameter which may be communicated to the controller 110 via the network interface 112 and the receiver 1101. It may be based on the capacity of available storage and a desired retention time.

Figure 5A:
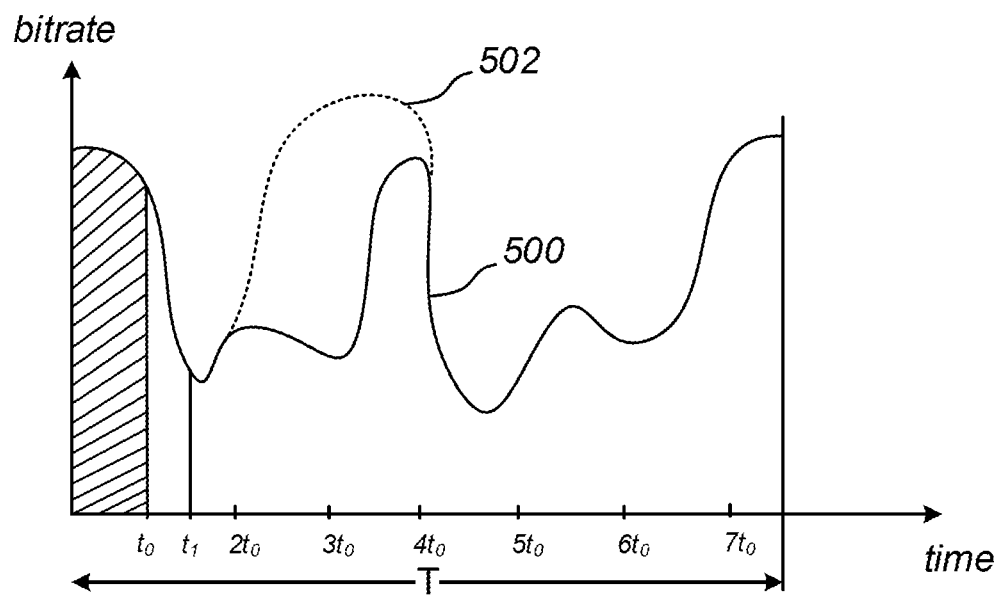
FIGS. 5a-5d each illustrates output bitrate of a video encoder as a function of time.
Figure 5B:
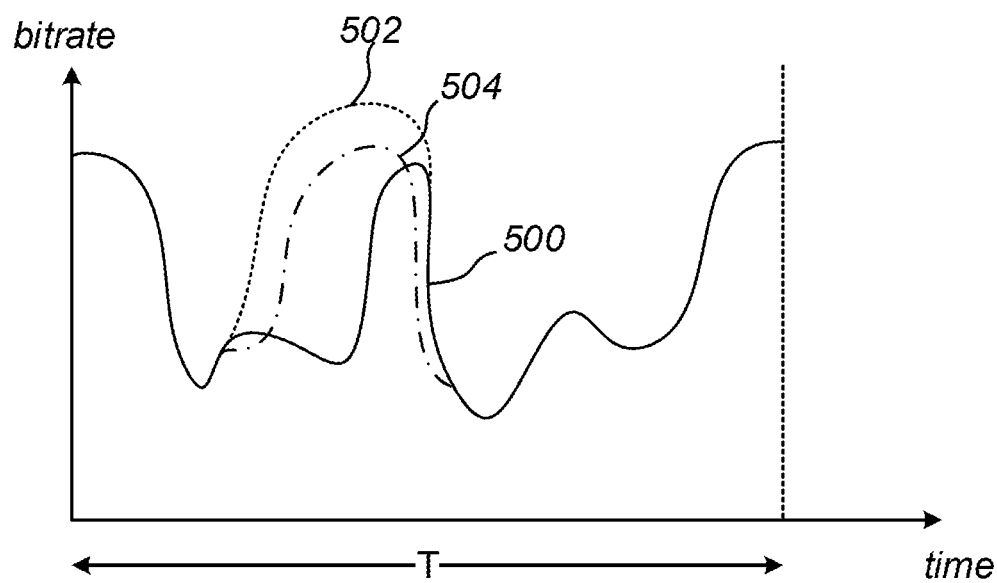
Figure 5C:
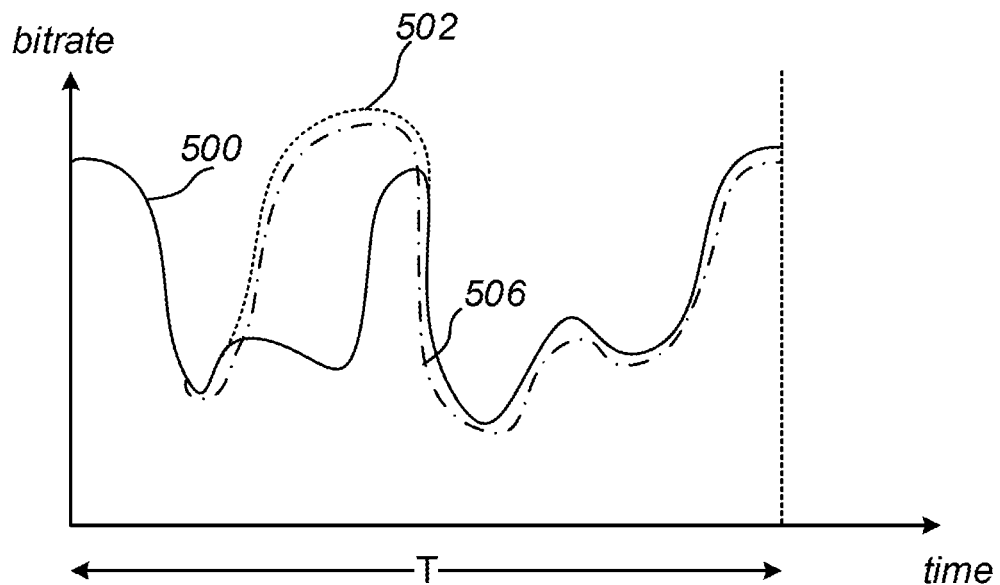
Figure 5D:
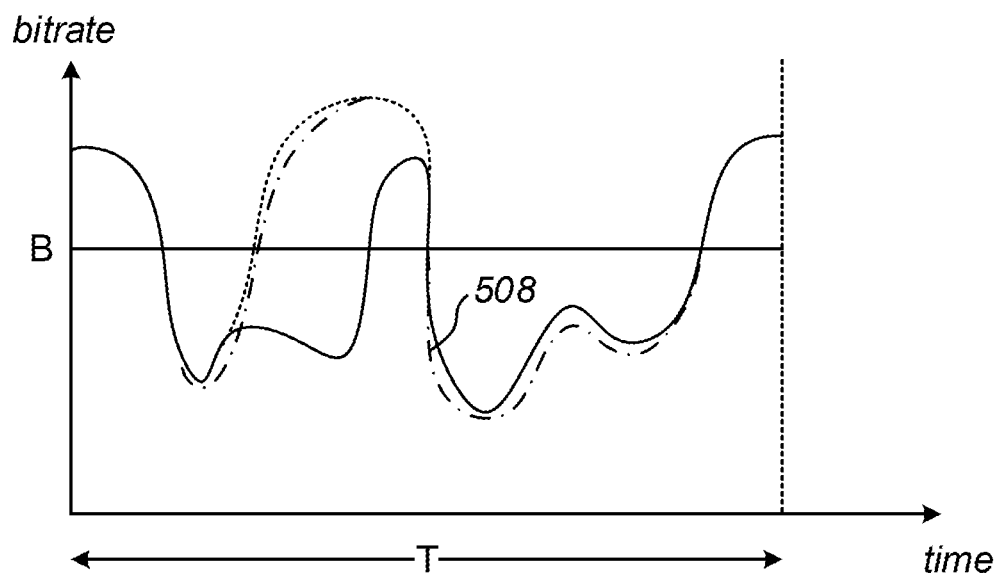

In step S404, the controller 101 may, via the receiver 1101 receive previously collected bitrate data. The previously collected bitrate data may be in the form of a curve which describes the temporal variation of the average output bitrate of the video encoder 108 during a time interval T. Such a curve may be calculated by collecting output bitrate data from a plurality of time intervals T in the past, such as bitrate data from a plurality of weeks in the past, and calculating an average with respect to the plurality of time intervals. An example of such a curve 500 is illustrated in FIG. 5a. The area under the curve 500, i.e., the time integral of the curve, is hence the average number of bits that are output during the time period T. The average number of bits that are output during the time period T is assumed to be equal to or lower than the maximum number of output bits allowed by the bit budget. In this sense, the curve 500 may be seen as a distribution of the available bit budget over time. Similarly, the integral of the curve up till time $t\_0$ is the average number of bits that are output until time $t\_0$. In other words, from the curve 500, the expected number of bits that are output before a certain point in time may be calculated.

Previously collected bitrate data may also be used to set a nominal compression level which may serve as a base level, or reference level, for the compression level. The compression level may then be adjusted in relation to the nominal compression level, e.g., in steps S406 and S412 described below. The nominal compression level is preferably set at the outset of the time interval, and may hence be seen as a start value of the compression level. The nominal compression level may be set based on the previously collected bitrate data. In more detail, the previously collected bitrate data may be associated with a compression level that was used by the video encoder 108 when generating the previously collected bitrate data. If it is found that the previously collected bitrate data does not fit within the desired bit budget, such as if the area under the curve 500 exceeds the bit budget, the nominal compression level should be higher than the compression level associated with the previously collected bitrate data, and vice versa. In practice, bitrate data may be collected for various compression levels, and on basis of that a nominal compression level may be set to correspond to a compression level being associated with a bitrate curve that does not exceed the desired bit budget.

In step S406, the output bitrate adjuster 1103 adjusts the compression level of the video stream. In more detail, the output bitrate adjuster 1103 may during the time interval T periodically adjust the compression rate. For example, if the time interval T corresponds to a day (24 hours), the compression rate may be updated on an hourly basis. In particular, the compression rate may be adjusted to make sure that the bit budget is not exceeded at the end of the time interval T. For this purpose, the output bitrate adjuster may, via input from the video encoder 108, keep track of the number of bits that are spent during the time interval. The output bitrate adjuster 1103 may then compare the bits that actually were output from the video encoder 108 at time point $t\_0$, say, to the expected number of output bits at time $t\_0$. As described above, the latter may be found by integrating the curve 500 of FIG. 5a up to time point $t\_0$. If the number of bits that were output of the encoder 108 exceeds the expected number of output bits, the output bitrate adjuster 1103 may increase the compression level. If the number of bits that were output of the encoder 108 is lower than the expected number of output bits, the output bitrate adjuster 1103 may decrease the compression level.

Generally, the amount of the compression level adjustment may be done in different ways as is known in the art. For example, a proportional control strategy may be used where the size of the adjustment is proportional to the difference between the actual number of bits that were output from the encoder and the expected number of output bits.

As an alternative, or a complement, to adjusting the compression level periodically, the compression level may also be adjusted if it is found that the number of bits that were actually output differs from the expected number of output bits by more than a threshold amount.

Figure 3:
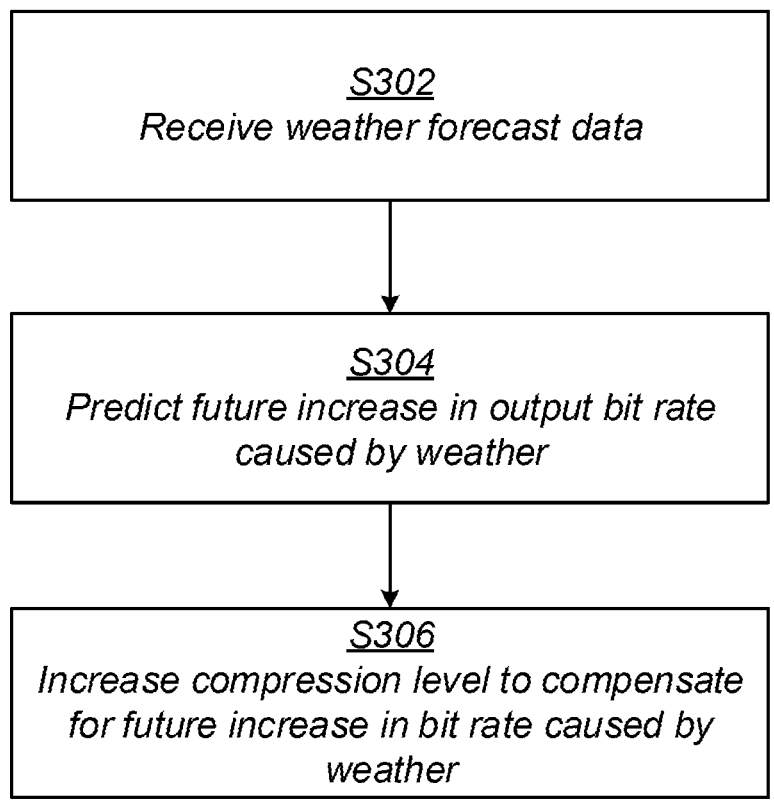
FIG. 3 is a flowchart of a method for controlling output bitrate of a video encoder when encoding a video stream according to embodiments.
Figure 4:
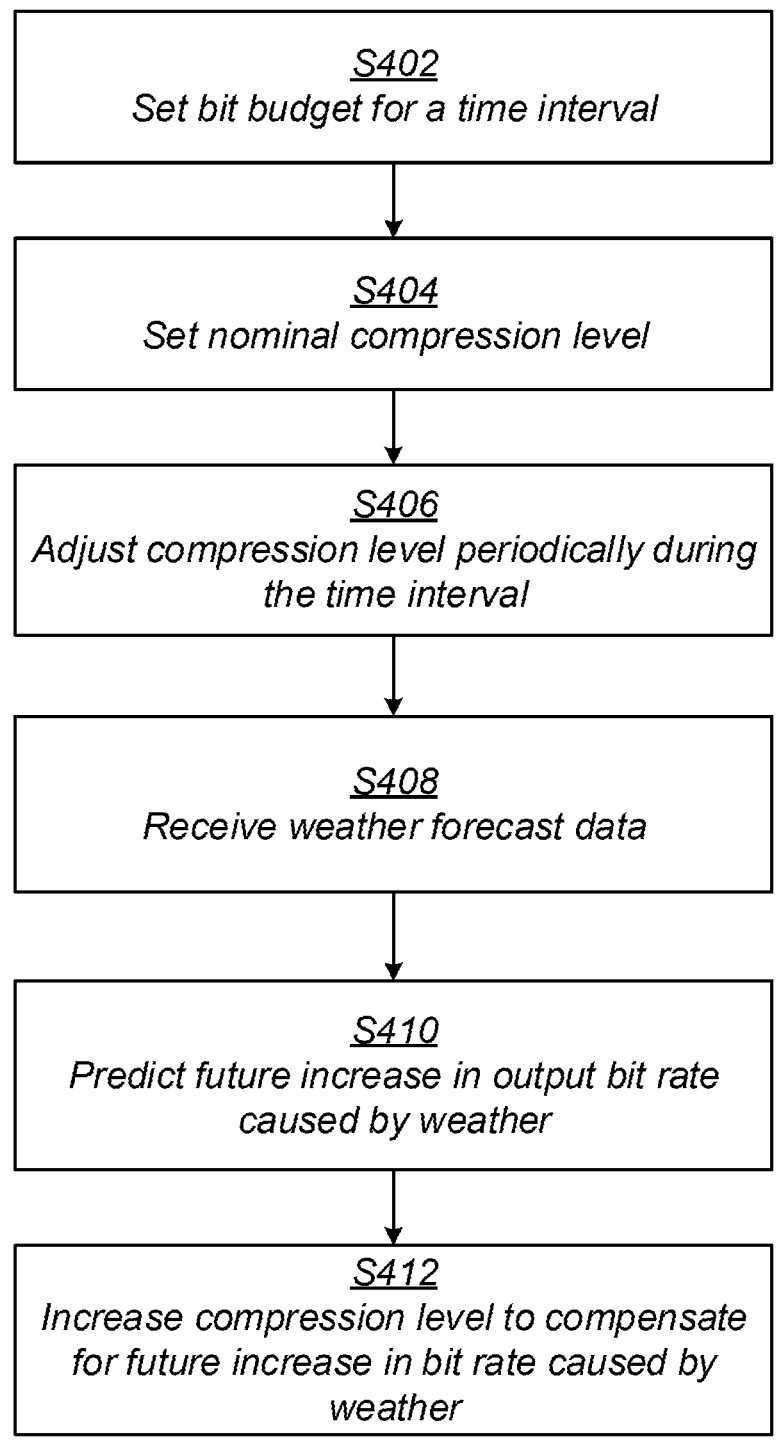
FIG. 4 is a flowchart of a method for controlling output bitrate of a video encoder when encoding a video stream according to embodiments.

In step S408, weather forecast data is received in accordance with what was described with respect to step S302 of FIG. 3. The weather forecast data may be received at any time point during the time interval T. In the example of FIG. 5a, the weather forecast data is assumed to be received at time $t\_1$.

It is to be noted that there is no specific order of steps S406 and S408. On the one hand, the adjustment of step S406 is carried out at several occasions during the time interval T, such as periodically (at time points $t\_0, 2t\_0, 3t\_0$ ... of FIG. 5a) during the time interval T. On the other hand, step S408 may happen at any time during the time interval T, such as at time $t\_1$ of FIG. 5a. As a matter of fact, step S408 may trigger an adjustment of the compression level (see steps S410, S412 below) which is in addition to the regular adjustments described in step S406.

In step S410 the predictor 1102 proceeds to predict a future increase in output bitrate based on the weather forecast data in accordance with what was described with respect to step S304 of FIG. 3. Referring to the example of FIG. 5a, the output bitrate is predicted to increase to the dashed curve 502 due to the weather affecting contents in the video stream.

In step S412, the output bitrate adjuster 1103 proceeds to increase the compression level so as to compensate for the predicted increase in output bitrate caused by the weather, thereby making sure that the bit budget is kept in the end. This is in accordance with what was described in connection to step S306 of FIG. 3.

Generally, the output bitrate adjuster 1103 increases the compression level during at least a time portion of the time interval T. However, the output bitrate adjuster 1103 may have different strategies for selecting when to increase the compression level so as to compensate for the predicted increase in output bitrate. According to one strategy, the compression level is increased during the predicted increase in output bitrate. In other words, the periods when the compression level is increased are selected based on the weather forecast data. This is illustrated by the dash-dotted curve 504 in FIG. 5b, which shows the final output bitrate for that case. According to another strategy, the compression level is increased during the remainder of the time interval T. This is illustrated by the dash-dotted curve 506 of FIG. 5c. According to yet another strategy, the compression level is increased during a time portion of the time interval T which is selected based on the average bitrate curve 500. In more detail, the compression level may be increased when the average bitrate curve is below a threshold. This is illustrated by the dash-dotted curve 508 in FIG. 5d, which shows the final output bitrate for that case. The threshold is denoted by B. According to still another strategy, the compression level is increased based on the contents of the video stream, such as when the level of motion in the video stream is below a threshold.

There may be different approaches for setting the amount of increase of compression level in step S412. Various things, such as the codec used, have an impact on the relation between compression level and output bitrate. As further described above, also the severity of the weather and the location of the camera has an impact on how much the compression level should be increased. Certain testing is therefore required in order to measure how the compression level affects the output bitrate for different cameras in different scenarios. However, it should also be recalled that due to the periodic adjustment in step S406 a further increase of the compression level may be made if it is found that the compression level was not increased enough in step S412. Conversely, if the compression level was increased too much in step S412, it may be decreased again in the regular adjustment carried out in step S406. The system is hence self-regulatory in that respect. However, when increasing the compression level in step S412, it may be wise to consider the remaining bit budget and the remaining time of the time interval. Typically, the amount of increase in compression level should be higher if there is only a short time remaining compared to if there had been a longer time remaining, since the weather caused increase in bitrate has to be compensated for in a relatively short amount of time. Similarly, if there is only a low number of bits left to be spent, the amount of increase in compression level typically needs to be higher compared to if there had been more bits left to spend, since in that situation there are likely no spare bits left to spend on the weather caused increase in bitrate.

The amount of the increase may further be determined based on the curve 500 of previously collected bitrate data. In this way, the future expected bit costs, which may be deduced from the curve 500 may also be taken into account when deciding by how much the compression level should be increased to compensate for the weather caused increase in bitrate. For example, if there are high expected bit costs during the remainder of the time interval in relation to the remaining bits to spend, the increase in compression level typically needs to be higher compared to if the expected bit costs during the remainder of the timer interval are low in relation to the remaining bits to spend. In other words, by comparing the remaining bit budget to the remaining expected bit costs, it may be determined how many bits that may be spent on the future weather caused increase in bitrate. If it is found that there are not enough remaining bits left to cover the weather caused increase in bitrate, the compression level should be increased. The amount of increase of the compression level is set such that the corresponding amount in reduction of output bitrate assures that the weather caused increase in bitrate will be covered by the remaining bit budget.

It will be appreciated that a person skilled in the art can modify the above-described embodiments in many ways and still use the advantages of the present teachings as shown in the embodiments above. Thus, the present teachings should not be limited to the shown embodiments but should only be defined by the appended claims. Additionally, as the skilled person understands, the shown embodiments may be combined.

What is claimed is:

1. A method for controlling output bitrate of a video encoder when encoding a video stream, comprising:
   receiving, at a current time point, weather forecast data being indicative of a future weather condition for a location where the video stream is captured, wherein the weather forecast data includes one or more weather related parameters being indicative of the future weather condition and an indication of a time point when the weather condition will occur;
   predicting, based on the weather forecast data, that the future weather condition will affect the output bitrate of the video encoder due to noise or motion being introduced in the video stream if at least one of the one or more weather related parameters falls outside of a predefined parameter interval;
   increasing a compression level currently applied by the video encoder when compressing the video stream in response to predicting that the future weather condition will affect the output bitrate, wherein the compression level is increased in advance of the time point when the weather condition will occur;
   setting a bit budget corresponding to a maximum number of bits that are allowed to be output from the video encoder during a time interval;
   receiving previously collected bitrate data indicating an average temporal variation of output bitrate of the video encoder during the time interval;
   calculating, from the previously collected bitrate data, a number of bits which on average is output from the video encoder at a time point among a plurality of time points during the time interval; and
   adjusting the compression level by:
      increasing the compression level if a number of bits that has been output from the video encoder at the current time point exceeds the calculated number of bits which on average is output from the video encoder at the time point, and
      decreasing the compression level if the number of bits that has been output from the video encoder at the current time point is below the calculated number of bits which on average is output from the video encoder at the time point.

2. The method of claim 1, wherein the one or more weather related parameters include at least one of a rain fall level, a snow level, a moisture level, a temperature, and a wind speed.

3. The method of claim 1, wherein the compression level of the video stream is adjusted periodically during the time interval.

4. The method of claim 1, further comprising:
   keeping track of a number of bits that, according to the bit budget, remains to be output from the video encoder during the time interval, and a remaining time of the time interval,
   wherein, in the increasing the compression level currently applied by the video encoder, the compression level is increased by an amount which is determined based on at least the number of bits that remains to be output from the video encoder during the time interval, and the remaining time of the time interval.

5. The method of claim 4, wherein the amount is further determined based on the previously collected bitrate data indicating an average temporal variation of output bitrate of the video encoder during the time interval.

6. A controller for controlling output bitrate of a video encoder when encoding a video stream, comprising:
   receiver circuitry configured to receive, at a current time point, weather forecast data being indicative of a future weather condition for a location where the video stream is captured, wherein the weather forecast data includes one or more weather related parameters being indicative of the future weather condition and an indication of a time point when the weather condition will occur;
   predictor circuitry configured to predict, based on the weather forecast data, that the future weather condition will affect the output bitrate of the video encoder due to noise or motion being introduced in the video stream if at least one of the one or more weather related parameters falls outside of a predefined parameter interval;
   output bitrate adjuster circuitry configured to:
      increase a compression level currently applied by the video encoder when compressing the video stream in response to predicting that the future weather condition will affect the output bitrate, wherein the compression level is increased in advance of the time point when the weather condition will occur;

set a bit budget corresponding to a maximum number of bits that are allowed to be output from the video encoder during a time interval;

calculate, from previously collected bitrate data indicating an average temporal variation of output bitrate of the video encoder during the time interval, a number of bits which on average is output from the video encoder at a time point among a plurality of time points during the time interval; and adjust the compression level by:
increasing the compression level if a number of bits that has been output from the video encoder at the current time point exceeds the calculated number of bits which on average is output from the video encoder at the time point, and decreasing the compression level if the number of bits that has been output from the video encoder at the current time point is below the calculated number of bits which on average is output from the video encoder at the time point.

7. A video camera comprising:
a sensor;
a video encoder; and
a controller for controlling output bitrate of the video encoder comprising:
receiver circuitry configured to receive, at a current time point, weather forecast data being indicative of a future weather condition for a location where the video stream is captured by the sensor, wherein the weather forecast data includes one or more weather related parameters being indicative of the future weather condition and an indication of a time point when the weather condition will occur;
predictor circuitry configured to predict, based on the weather forecast data, that the future weather condition will affect the output bitrate of the video encoder due to noise or motion being introduced in the video stream if at least one of the one or more weather related parameters falls outside of a predefined parameter interval;
output bitrate adjuster circuitry configured to:
increase a compression level currently applied by the video encoder when compressing the video stream in response to predicting that the future weather condition will affect the output bitrate, wherein the compression level is increased in advance of the time point when the weather condition will occur;
set a bit budget corresponding to a maximum number of bits that are allowed to be output from the video encoder during a time interval;
calculate, from previously collected bitrate data indicating an average temporal variation of output bitrate of the video encoder during the time interval, a number of bits which on average is output from the video encoder at a time point among a plurality of time points during the time interval; and
adjust the compression level by:
increasing the compression level if a number of bits that has been output from the video encoder at the current time point exceeds the calculated number of bits which on average is output from the video encoder at the time point, and
decreasing the compression level if the number of bits that has been output from the video encoder at the current time point is below the calculated number of bits which on average is output from the video encoder at the time point.

8. A non-transitory computer-readable medium having instructions stored thereon for controlling output bitrate of a video encoder when encoding a video stream, execution of which by a computing device causes the computing device to perform operations comprising:
receiving, at a current time point, weather forecast data being indicative of a future weather condition for a location where the video stream is captured by a video camera, wherein the weather forecast data includes one or more weather related parameters being indicative of the future weather condition and an indication of a time point when the weather condition will occur;
predicting, based on the weather forecast data, that the future weather condition will affect the output bitrate of the video encoder due to noise or motion being introduced in the video stream if at least one of the one or more weather related parameters falls outside of a predefined parameter interval;
increasing a compression level currently applied by the video encoder when compressing the video stream in response to predicting that the future weather condition will affect the output bitrate, wherein the compression level is increased in advance of the time point when the weather condition will occur;
setting a bit budget corresponding to a maximum number of bits that are allowed to be output from the video encoder during a time interval;
receiving previously collected bitrate data indicating an average temporal variation of output bitrate of the video encoder during the time interval;
calculating, from the previously collected bitrate data, a number of bits which on average is output from the video encoder at a time point among a plurality of time points during the time interval; and
adjusting the compression level by:
increasing the compression level if a number of bits that has been output from the video encoder at the current time point exceeds the calculated number of bits which on average is output from the video encoder at the time point, and
decreasing the compression level if the number of bits that has been output from the video encoder at the current time point is below the calculated number of bits which on average is output from the video encoder at the time point.

9. The controller of claim 6, wherein the one or more weather related parameters include at least one of a rain fall level, a snow level, a moisture level, a temperature, and a wind speed.

10. The controller of claim 6, wherein the compression level of the video stream is adjusted periodically during the time interval.

11. The controller of claim 6, wherein the output bitrate adjuster circuitry is further configured to:
track of a number of bits that, according to the bit budget, remain to be output from the video encoder during the time interval, and a remaining time of the time interval,
wherein, in the increasing the compression level currently applied by the video encoder, the compression level is increased by an amount which is determined based on at least the number of bits that remains to be output from the video encoder during the time interval, and the remaining time of the time interval.

12. The controller of claim 11, wherein the amount is further determined based on the previously collected bitrate data indicating an average temporal variation of output bitrate of the video encoder during the time interval.

13. The video camera of claim 7, wherein the one or more weather related parameters include at least one of a rain fall level, a snow level, a moisture level, a temperature, and a wind speed.

14. The video camera of claim 7, wherein the compression level of the video stream is adjusted periodically during the time interval.

15. The video camera of claim 7, wherein the output bitrate adjuster circuitry is further configured to:
   track of a number of bits that, according to the bit budget, remain to be output from the video encoder during the time interval, and a remaining time of the time interval,
   wherein, in the increasing the compression level currently applied by the video encoder, the compression level is increased by an amount which is determined based on at least the number of bits that remains to be output from the video encoder during the time interval, and the remaining time of the time interval.

16. The video camera of claim 15, wherein the amount is further determined based on the previously collected bitrate data indicating an average temporal variation of output bitrate of the video encoder during the time interval.

17. The non-transitory computer-readable medium of claim 8, wherein the one or more weather related parameters include at least one of a rain fall level, a snow level, a moisture level, a temperature, and a wind speed.

18. The non-transitory computer-readable medium of claim 8, wherein the compression level of the video stream is adjusted periodically during the time interval.

19. The non-transitory computer-readable medium of claim 8, further comprising:
   keeping track of a number of bits that, according to the bit budget, remains to be output from the video encoder during the time interval, and a remaining time of the time interval,
   wherein, in the increasing the compression level currently applied by the video encoder, the compression level is increased by an amount which is determined based on at least the number of bits that remains to be output from the video encoder during the time interval, and the remaining time of the time interval.

20. The non-transitory computer-readable medium of claim 19, wherein the amount is further determined based on the previously collected bitrate data indicating an average temporal variation of output bitrate of the video encoder during the time interval.

* * * * *